United States Patent

Inoue et al.

[11] Patent Number: 6,159,310
[45] Date of Patent: Dec. 12, 2000

[54] WIRE FOR WELDING HIGH-CHROMIUM STEEL

[75] Inventors: Hiroshige Inoue, Futtsu; Toshihiko Koseki, Oita; Shigeru Ohkita, Futtsu, all of Japan

[73] Assignee: Nippon Steel Corporation, Tokyo, Japan

[21] Appl. No.: 09/308,502

[22] PCT Filed: Nov. 18, 1997

[86] PCT No.: PCT/JP97/04190

§ 371 Date: May 17, 1999

§ 102(e) Date: May 17, 1999

[87] PCT Pub. No.: WO98/22255

PCT Pub. Date: May 28, 1998

[30] Foreign Application Priority Data

Nov. 18, 1996 [JP] Japan .................................. 8-321210

[51] Int. Cl.[7] ............................ C22C 38/44; C22C 38/40
[52] U.S. Cl. ........................... 148/325; 148/327; 420/34; 420/56; 420/57; 219/146.23
[58] Field of Search ..................... 148/325, 327; 420/34, 56, 57; 219/146.23

[56] References Cited

U.S. PATENT DOCUMENTS 3,769,003 10/1973 Kenyon ................................ 75/128 W
5,944,921 8/1999 Cumino et al. ........................ 148/325

FOREIGN PATENT DOCUMENTS 51-32449 3/1976 Japan .
7-185879 7/1995 Japan .

*Primary Examiner*—Deborah Yee
*Attorney, Agent, or Firm*—Kenyon & Kenyon

[57] ABSTRACT

To form a weld metal having improved hot cracking resistance, low temperature cracking resistance, toughness, strength, and corrosion resistance when welding high Cr steels containing 7.5 wt % or more Cr, the filler wire of the present invention has the ratio of Cr equivalent/Ni equivalent of 1.8 to 2.8 and the product: of Cr equivalent×Ni equivalent of 100 to 140, where Cr equivalent=Cr+Mo+1.5 Si, Ni equivalent=Ni+0.5 Mn+30C; and forms a weld metal having a ternary phase microstructure composed of austenite, ferrite and martensite phases during the gas-shielded arc welding. The filler wire of the present invention typically consists of 0.005–0.12 wt % C, 0.01–1.0 wt % Si, 0.02–2.0 wt % Mn, 12.0–17.0 wt % Cr, 5.0–8.0 wt % Ni, 1.0–3.0 wt % Mo, and the balance of Fe and unavoidable impurities, the impurities including 0.03 wt % or less P and 0.01 wt % or less S.

8 Claims, No Drawings

WIRE FOR WELDING HIGH-CHROMIUM STEEL

This application is a 371 of PCT/JP97/04190 filed Nov. 18, 1997.

TECHNICAL FIELD

The present invention relates to a filler wire for welding high Cr steels and, in particular, to a filler wire suitable for welding high Cr steels applicable to petroleum or natural gas transport pipelines and storage vessels or other applications requiring high strength, toughness and corrosion resistance.

BACKGROUND ART

An increasing proportion of the products of petroleum and natural gas contain wet carbonic acid gas or hydrogen sulfide gas. It is well known that carbon steels and low alloy steels are subjected to heavy corrosion in such wet environments. Therefore, in the transport of corroding petroleum and natural gas, corrosion inhibitors have been conventionally used to protect steel pipes from corrosion. However, it is becoming more and more difficult to use corrosion inhibitors in offshore oil wells because of the vast expenditure required for the addition and recovery thereof and because of sea pollution. There is thus an increasing need for corrosion resistant materials requiring no additional corrosion inhibitors.

To this end, there have been many proposals for steels or steel pipes having good corrosion resistance to carbonic acid-containing environments or the like and also having good weldability. Generally, the proposed steels and steel pipes contain about 11 to 15 wt % Cr to achieve the corrosion resistance to carbonic acid-containing environments, have a reduced C content to provide an improved weldability, and are heat-treated by quenching and tempering to establish a microstructure of tempered martensite to ensure good strength and toughness. For example, Japanese Unexamined Patent Publication (Kokai) No. 4-99154 and Japanese Unexamined Patent Publication (Kokai) No. 4-99155 disclose high Cr steels for pipelines in which the C and N contents are reduced and substitutional elements, such as an austenite stabilizer, are added to ensure good weldability.

Pipelines and pressure vessels are joined or produced by welding. However, there were no filler materials and welding methods applicable to the above recited high Cr weldable steels. "NKK Technical Report", 1989, No. 129, pages 15–22 reports that AISI 410 steel was produced in the form of a UOE pipe and a TIG-welded joint (corresponding to that produced in field welding of a pipeline along the circumferential profile line thereof) was formed using a filler material corresponding in composition to the base material with additional Ni. However, as can be seen from the publication recited above, a filler material corresponding in composition to a high Cr steel, even though containing a large amount of Ni, produces a weld metal having a very high hardness. The weld metal is also very susceptible to low temperature cracking and absolutely requires pre- or post-weld heat treatment. Therefore, it is practically difficult to weld high Cr steels by using a composition-corresponding filler material or a filler material of a martensitic stainless steel.

On the other hand, when high Ni austenitic stainless steels having good corrosion resistance and Ni-based super alloys are used as a filler material, the weld metal does not cause preferential corrosion thereof, has a low hardness, and ensures good toughness of a weld metal. However, austenitic stainless steels and Ni-based super alloys have a drawback in a low strength because of the crystal structures thereof. If a weld metal has a very low strength, an external force may cause a concentrated deformation at the weld metal leading to a detrimental fracture (as characterized by the term "under-matching"). Therefore, it was also very difficult to perform welding of high Cr steels using a filler material of austenitic stainless steel or high Ni alloy. In recent years, dual-phase stainless steels were also used as a filler material but they mostly caused under-matching because the weld metal had a low strength.

DISCLOSURE OF THE INVENTION

It is therefore the object of the present invention to provide a filler wire advantageously applicable to welding high Cr steels, requiring neither pre- nor post-weld heat treatments, to produce a weld zone which has good resistance to both hot cracking and low temperature cracking, has high toughness and strength, and has good corrosion resistance in carbonic acid-containing environments or the like.

To achieve the object according to the present invention, there is provided a filler wire for gas-shielded arc welding of high Cr steels containing 7.5 wt % or more Cr, characterized in that:

the filler wire has a ratio of Cr equivalent/Ni equivalent of 1.8 to 2.8 and a product of Cr equivalent×Ni equivalent of 100 to 140, where Cr equivalent=Cr+Mo+1.5Si and Ni equivalent=Ni+0.5 Mn+30C; and forms a weld metal having a ternary phase microstructure composed of austenite, ferrite and martensite phases during the gas-shielded arc welding.

A filler wire according to the present invention typically has a chemical composition consisting of:

0.005–0.12 wt % C, 0.01–1.0 wt % Si, 0.02–2.0 wt % Mn, 12.0–17.0 wt % Cr, 5.0–8.0 wt % Ni, 1.0–3.0 wt % Mo, and the balance of Fe and unavoidable impurities including 0.03 wt % or less P and 0.01 wt % or less S.

A filler wire according to the present invention preferably further contains 0.1 to 2.0 wt % Cu.

A filler wire according to the present invention preferably further contains at least one of 0.005 to 0.05 wt % Ti and 0.005 to 0.05 wt % Al.

The high Cr steels which constitute a base material to be welded by using a filler wire according to the present invention generally have an upper limit to the Cr content of 13 wt %.

A typical embodiment of such consists of:

0.035 wt % or less C, 0.50 wt % or less Si, 0.1 to 1.5 wt % Mn, 9 to 13 wt % Cr, 1.5 to 6.5 wt % Ni, 1.0 to 3.0 wt % Mo, 0.05 wt % or less Al, 0.02 wt % or less N, and the balance of Fe and unavoidable impurities including 0.03 wt % or less P and 0.005 wt % or less S, and is in the form of a weldable martensitic stainless steel pipe having a microstructure mainly composed of a tempered martensite.

The weldable martensitic stainless steel pipe may further contain 0.3 to 1.8 wt % Cu.

The high Cr steels which constitute a base material to be welded by using a filler wire according to the present invention has a Cr content generally of 7.5 wt % or more, usually of 13 wt % or less, and typically of 7.5 to 12 wt % and has a microstructure of either a single martensite phase or 50% or more martensite phase and the balance of ferrite.

The filler wire of the present invention consists of a stainless steel having a chemical composition defined for the following reasons.

C: C is present in an amount of 0.005 wt % or more as an element to significantly increase the strength of a weld metal and as an austenite former. C also forms Cr carbides thereby reducing the corrosion resistance but, when the C content is 0.12 wt % or less, the C addition does not significantly reduce the corrosion resistance but ensures that it is not lower than that of the base material of a high Cr steel. However, when the C content is more than 0.12 wt %, the corrosion resistance and toughness of a weld metal is reduced and, therefore, the upper limit of the C content is 0.12 wt %.

Si: Si is effective as a deoxidizer and strengthening element for a weld metal, where the deoxidizing effect is not significant when the Si content is less than 0.01 wt % and, on the other hand, when the Si content is more than 1.0 wt %, not only no further effect is obtained but also the impact toughness is reduced and, therefore, the Si content must be within the range of 0.01 to 1.0 wt %.

Mn: Mn is necessary as a deoxidizer for a weld metal, is also important as an austenite former to provide a desired microstructure of a weld metal and must be present in an amount of 0.02 wt % or more. However, when the Mn content is more than 2.0 wt %, not only no further effect is obtained but also production of the filler wire is difficult and, therefore, the upper limit of the Mn content is 2.0 wt %.

Cr: Cr must be present in an amount of 12.0 wt % or more but, when the Cr content is more than 17.0 wt %, it is difficult to ensure formation of the martensitic structure, which is necessary for the strength of a weld metal. Therefore, the Cr content must be 12.0 to 17.0 wt %.

Ni: Ni is necessary for stable formation of austenite in the microstructure of a weld metal to provide good toughness and corrosion resistance. When the Ni content is less than 5.0 wt %, good toughness cannot be obtained. On the other hand, when the Ni content is more than 8 wt %, the austenite fraction is excessive and the strength of a weld metal is reduced while no further improvement is provided in the toughness. Therefore, the Ni content must be 5.0 to 8.0 wt %.

Mo: Mo is added to ensure the corrosion resistance and high strength of a weld metal. When the Mo content is less than 1.0 wt %, the weld metal cannot have good corrosion resistance and strength and, when the Mo content is more than 3.0 wt %, intermetallic compounds are formed in the weld metal to reduce the toughness. Therefore, the Mo content must be 1.0 to 3.0 wt %.

P: P reduces the hot cracking resistance and the toughness of a weld metal when present in a large amount and, therefore, the P content is preferably small and must be reduced to 0.03 wt % or less. The smaller the P content, the more preferable.

S: S also reduces the hot cracking resistance, hot workability, ductility, and corrosion resistance of a weld metal and the S content is preferably small and must be reduced to 0.01 wt % or less. The S content is preferably 0.005 wt % or less in order to facilitate production of a filler material and to provide further improvement of the corrosion resistance of a weld metal.

Cr equivalent/Ni equivalent: When the Cr equivalent/Ni equivalent ratio is smaller than 1.8, solidification of a weld metal produces a single austenite phase, which is susceptible to hot cracking and cannot ensure the strength. On the other hand, when the ratio is greater than 2.8, ferrite forms in a large amount in the weld metal to reduce the toughness. Therefore, the Cr equivalent/Ni equivalent ratio must be 1.8 to 2.8.

Cr equivalent×Ni equivalent: When the product of Cr equivalent×Ni equivalent is smaller than 100, martensite forms in a large amount in the weld metal to reduce the impact toughness. On the other hand, when the product is greater than 140, the martensite content is too small to ensure the strength. Therefore, the Cr equivalent×Ni equivalent product must be 100 to 140.

The above-recited elements are essential to the filler wire of the present invention and, in accordance with need, the following elements may also be contained to provide further improvement of the properties.

Cu: Cu remarkably improves the strength and the corrosion resistance of the weld metal, ensures the toughness as an austenite former and is added in an amount of 0.1 wt % or more. However, when the Cu content is more than 2.0 wt %, no further improvement is obtained whereas the productivity of the filler material is lowered. Therefore, the upper limit of the Cu content is 2.0 wt %.

Ti: Ti facilitates precipitation of fine ferrite particles in the crystal grains of the weld metal to improve the toughness and is added in an amount of 0.005 wt % or more. However, when the Ti content is more than 0.05 wt %, Ti-based inclusions are formed in a large amount in the weld metal to reduce the toughness. Therefore, the upper limit of the Ti content is 0.05 wt %.

Al: Al also facilitates precipitation of fine ferrite particles in the crystal grains of the weld metal to improve the toughness and is added in an amount of 0.005 wt % or more. However, when the Ti content is more than 0.05 wt %, Al-based inclusions are formed in a large amount in the weld metal to reduce the toughness. Therefore, the upper limit of the Al content is 0.05 wt %.

According to the present invention, the microstructure of the weld metal is specified for the following reasons.

The weld metal must have a ternary phase microstructure composed of austenite, ferrite, and martensite phases to simultaneously satisfy the plural requirements of low temperature cracking resistance, hot cracking resistance, strength, impact toughness, and corrosion resistance. A single ferrite phase causes poor impact toughness and poor strength. A single austenite phase involves the danger of inducing hot cracking and also causes very poor strength. A single martensite phase causes poor impact toughness and involves danger of inducing low temperature cracking. A ferrite-austenite dual phase provides good resistance to cracking and good toughness but causes poor strength. A ferrite-martensite dual phase causes high sensitivity to low temperature cracking and poor impact toughness. An austenite-martensite dual phase causes high sensitivity to hot cracking.

The austenite-ferrite-martensite ternary phase provides an improved strength and toughness of the weld metal and prevents hot cracking because the austenite phase ensures the toughness and the resistance to low temperature cracking, the martensite phase ensures the strength, and the ferrite phase ensures the resistance to hot cracking. Moreover, occurrence of low temperature cracking is suppressed even when no pre- or post-weld heat treatments are carried out.

The present invention is applicable to the high Cr steel which generally contains 7.5 to 13.0 wt % Cr, typically 7.5 to 12.5 wt % Cr and has a microstructure composed of either a single martensite phase or 50 wt % or more martensite phase and the balance of ferrite, in which high strength is required. When the martensite phase content is less than 50 wt %, the strength is not ensured. When the Cr content is reduced to 12 wt % or less, it becomes easier to ensure 50 wt % or more martensite. When the Cr content is less than 7.5 wt %, the corrosion resistance is not ensured. The present invention is particularly advantageous when a base material has a yield strength of 650 N/mm or more.

In high Cr steels which have a microstructure composed of a single ferrite phase or containing more than 50% ferrite, the strength is not necessarily high and the weld zone need not have a very high strength. The present invention is not necessarily applied to these steels but may be applied causing no problems. The present invention is applicable to any high Cr steel without limitation by the components other than Cr, so long as the Cr content is within the above-specified range.

BEST MODE FOR CARRYING OUT THE INVENTION

Embodiments of the present invention will be described below. A base material (14.5 mm thick sheet) of a high Cr steel, having a chemical composition shown in Table 1, was provided with a groove having a groove angle of 60° and a root face of 1 mm. The steel sheet shown in Table 1 was quench-tempered and had a yield strength of 710 N/mm$^2$. Steels having chemical compositions shown in Table 2 were also made by vacuum melting and were wire-drawn in a usual manner to provide filler wires. The material shown in Table 1 was TIG-welded by using the filler wires under the condition of 200 A-24 V-40 cm/min. No pre- and post-weld heat treatments were conducted.

The microstructure of the weld metal was determined by etching cross-sections of the welded joints and the results were summarized in Table 3. An impact test was conducted by using a JIS No. 4 impact test piece (full size) taken from the welded joints and having the notch located at the weld metal. A tensile test was conducted at room temperature by using a JIS No. 5 tensile test piece taken along the direction perpendicular to the weld line and having a gauge portion which contained the weld metal, the heat affected zone, and the base material. A corrosion test was conducted in a wet carbonic acid gas environment by using a test piece taken from the weld metal of the welded joint. The corrosion test was carried out in an autoclave at a testing temperature of 120° C. with a pressure of the carbonic acid gas of 40 atm, in which the test pieces were immersed in a 5% NaCl aqueous solution for 30 days and the corrosion rate was determined from a weight change between before and after the immersion. It is generally recognized that a material is sufficiently corrosion-resistant to be practically acceptable if the material has a corrosion rate of less than 0.1 mm/year. A hot cracking test was conducted by the FISCO test specified by JIS Z 3155 and a low temperature cracking test was conducted by the U-shape weld cracking test specified by JIS Z 3157. The test results are also summarized in Table 3.

Regarding the results of the hot cracking test and the low temperature cracking test shown in Table 3, the symbols "○" and "x" indicate that no cracks were observed and that cracking occurred, respectively. In the result of the impact toughness test, the symbols "○", "x", and "xx" indicate fracture appearance transition temperatures of −30° C. or lower, −30° C. to 0°C., and higher than 0°C., respectively. In the result of the tensile test, the symbols "○" and "x" indicate that the test piece broke in the base material portion, not in the weld metal portion, and that the test piece broke in the weld metal portion. In the result of the corrosion test, the symbols "○" and "x" indicate corrosion rates of less than 0.1 mm/year and of 0.1 mm/year or more, respectively.

It can be seen from Table 3 that, in the inventive samples No. 1 to No. 7, the weld metal had a ternary phase microstructure composed of austenite, ferrite, and martensite phases and no pre- or post-weld heat treatments were necessary to simultaneously satisfy the multiple requirements of an improved resistance to hot and low temperature cracking, an improved impact toughness of the weld metal, an improved strength of the weld metal (breakage did not occur in the weld metal portion), and an improved corrosion resistance of the weld metal.

In contrast, the comparative sample No. 8 had a weld metal composed of a single ferrite phase to cause poor impact toughness and strength. The comparative samples 9 and 13 had weld metals composed of a single austenite phase and an austenite-martensite dual phase microstructure, respectively, caused welding hot cracking to occur. Moreover, the comparative sample Nos. 9 and 13 also had poor strength and poor toughness, respectively. The comparative sample Nos. 10 and 12 had weld metals composed of a single martensite phase and a martensite-ferrite dual phase structure, respectively, to cause low temperature cracking to occur and to cause very poor impact toughness. No. 10 also had poor corrosion resistance. The comparative sample No. 11 had a weld metal composed of a ferrite-austenite dual phase structure to provide an improved cracking resistance, toughness, and corrosion resistance but had poor strength causing breakage in the weld metal portion.

INDUSTRIAL APPLICABILITY

The present invention enables welding of high Cr steels requiring no pre- and post-weld heat treatments to provide improved hot cracking resistance, low temperature cracking resistance, toughness, strength, and corrosion resistance.

TABLE 1

| C | Si | Mn | P | S | Cr | Ni | Cu | Mo | Ti | Al | (wt %) N |
|---|----|----|---|---|----|----|----|----|----|----|---|
| 0.013 | 0.23 | 0.45 | 0.022 | 0.001 | 11.06 | 6.09 | 0.65 | 2.6 | 0.022 | 0.03 | 0.008 |

TABLE 2

|  | No. | C | Si | Mn | P | S | Cr | Ni | Mo | Cu | Ti | Al | Creq/Nieq | (wt %) Creq xNieq |
|---|---|---|---|---|---|---|---|---|---|---|---|---|---|---|
| Invention | 1 | 0.020 | 0.30 | 0.98 | 0.006 | 0.003 | 14.53 | 5.98 | 2.02 | — | — | — | 2.41 | 120 |
|  | 2 | 0.014 | 0.29 | 0.96 | 0.002 | 0.003 | 14.56 | 5.32 | 1.99 | — | — | — | 2.74 | 105 |
|  | 3 | 0.013 | 0.30 | 0.54 | 0.002 | 0.003 | 13.05 | 7.46 | 2.57 | — | — | — | 1.97 | 130 |
|  | 4 | 0.021 | 0.24 | 0.51 | 0.006 | 0.005 | 16.34 | 6.13 | 1.16 | — | — | — | 2.55 | 125 |
|  | 5 | 0.018 | 0.48 | 0.90 | 0.008 | 0.004 | 12.61 | 7.12 | 2.67 | 0.52 | — | — | 1.97 | 130 |
|  | 6 | 0.015 | 0.30 | 1.21 | 0.004 | 0.005 | 12.73 | 7.04 | 2.32 | — | 0.03 | 0.02 | 1.91 | 126 |
|  | 7 | 0.022 | 0.36 | 1.56 | 0.003 | 0.003 | 14.10 | 5.16 | 2.46 | 1.62 | 0.02 | — | 2.59 | 113 |
| Comparison | 8 | 0.023 | 0.27 | 0.95 | 0.015 | 0.005 | 18.54 | 0.15 | — | — | 0.05 | 0.02 | 14.4 | 25 |
|  | 9 | 0.022 | 0.39 | 0.47 | 0.020 | 0.005 | 17.84 | 13.11 | 0.51 | — | — | — | 1.35 | 265 |
|  | 10 | 0.032 | 0.44 | 0.61 | 0.023 | 0.006 | 11.03 | 5.31 | — | — | — | — | 1.77 | 77 |
|  | 11 | 0.013 | 0.12 | 1.55 | 0.016 | 0.004 | 25.72 | 8.35 | 3.25 | — | — | 0.01 | 3.06 | 277 |
|  | 12 | 0.031 | 0.31 | 0.49 | 0.017 | 0.005 | 14.63 | 3.12 | — | — | — | — | 3.51 | 65 |
|  | 13 | 0.012 | 0.25 | 0.56 | 0.021 | 0.003 | 17.25 | 10.26 | — | 0.84 | — | — | 1.62 | 192 |

(Creq: Cr equivalent, Nieq: Ni equivalent)

TABLE 3

|  | No. | Microstructure of weld metal | Hot cracking | Low temp. cracking | Impact | Tensile | Corrosion |
|---|---|---|---|---|---|---|---|
| Invention | 1 | austenite + ferrite + martensite | ○ | ○ | ○ | ○ | ○ |
|  | 2 | austenite + ferrite + martensite | ○ | ○ | ○ | ○ | ○ |
|  | 3 | austenite + ferrite + martensite | ○ | ○ | ○ | ○ | ○ |
|  | 4 | austenite + ferrite + martensite | ○ | ○ | ○ | ○ | ○ |
|  | 5 | austenite + ferrite + martensite | ○ | ○ | ○ | ○ | ○ |
|  | 6 | austenite + ferrite + martensite | ○ | ○ | ○ | ○ | ○ |
|  | 7 | austenite + ferrite + martensite | ○ | ○ | ○ | ○ | ○ |
| Comparison | 8 | ferrite | ○ | ○ | ×× | × | ○ |
|  | 9 | austenite | × | ○ | ○ | × | ○ |
|  | 10 | martensite | ○ | × | ×× | ○ | × |
|  | 11 | austenite + ferrite | ○ | ○ | ○ | × | ○ |
|  | 12 | ferrite + martensite | ○ | × | ×× | ○ | ○ |
|  | 13 | austenite + martensite | × | ○ | × | ○ | ○ |

What is claimed is:

1. A filler wire or gas-shielded arc welding of high Cr steels containing 7.5 wt % or more Cr, characterized in that: the filler wire has a ratio of Cr equivalent/Ni equivalent of 1.8 to 2.8 and a product of Cr equivalent×Ni equivalent of 100 to 140, where Cr equivalent=Cr+Mo+1.5Si and Ni equivalent=Ni+0.5Mn+30C; and forms a weld metal having a ternary phase microstructure composed of austenite, ferrite and martensite phases during gas-shielded arc welding.

2. A filler wire for high Cr steels according to claim 1, characterized in that the filler wire consists essentially of:
   0.005–0.12 wt % C,
   0.01–1.0 wt % Si,
   0.02–2.0 wt % Mn,
   12.0–17.0 wt % Cr,
   5.0–8.0 wt % Ni,
   1.0–3.0 wt % Mo, and
   the balance of Fe and unavoidable impurities including 0.03 wt % or less P and 0.01 wt % or less S.

3. A filler wire for high Cr steels according to claim 2, which further contains 0.1 to 2.0 wt % Cu.

4. A filler wire for high Cr steels according to claim 1, which further contains at least one of 0.005 to 0.05 wt % Ti and 0.005 to 0.05 wt % Al.

5. A filler wire for high Cr steels according to claims 1, characterized in that the high Cr steels have a Cr content of 13 wt % or less.

6. A filler wire for high Cr steels according to claim 1, characterized in that the high Cr steels consist of:
   0.035 wt % or less C,
   0.50 wt % or less Si,
   0.1 to 1.5 wt % Mn,
   9 to 13 wt % Cr,
   1.5 to 6.5 wt % Ni,
   1.0 to 3.0 wt % Mo,
   0.05 wt % or less Al,
   0.02 wt % or less N, and
   the balance of Fe and unavoidable impurities including 0.03 wt % or less P and 0.005 wt % or less S,
   the high Cr steels being in the form of a weldable martensitic stainless steel pipe having a microstructure mainly composed of a tempered martensite.

7. A filler wire according to claim 6, characterized in that the weldable martensitic stainless steel pipe further contains 0.3 to 1.8 wt % Cu.

8. A filler wire for high Cr steels according to claim 1, characterized in that the high Cr steels contains 12 wt % or less Cr and has a microstructure composed either of a single martensite phase or 50% or more martensite phase and the balance of ferrite.

* * * * *

UNITED STATES PATENT AND TRADEMARK OFFICE
CERTIFICATE OF CORRECTION

PATENT NO.   : 6,159,310
DATED        : December 12, 2000
INVENTOR(S)  : Hiroshige Inoue, et al.

It is certified that error appears in the above-identified patent and that said Letters Patent is hereby corrected as shown below:

Column 1,
Line 4, delete "This application is a 371 of PCT/JP97/04190, filed Nov.".
Line 5, delete "18, 1997".

Column 7,
Line 41, change "or" to -- for --.
Line 65, change "claims" to "claim-".

Signed and Sealed this

Ninth Day of October, 2001

Attest:

NICHOLAS P. GODICI
Attesting Officer    Acting Director of the United States Patent and Trademark Office